US012163439B1

(12) United States Patent
Thampi et al.

(10) Patent No.: US 12,163,439 B1
(45) Date of Patent: Dec. 10, 2024

(54) SPACERS, STRUCTURAL SUPPORT SYSTEMS, AND METHODS OF USE THEREOF

(71) Applicant: HONEYWELL INTERNATIONAL INC., Charlotte, NC (US)

(72) Inventors: Akhil Thampi, Bangalore (IN); Jayanth Hs, Bangalore (IN); Avinash Kumar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/494,032

(22) Filed: Oct. 25, 2023

(30) Foreign Application Priority Data

Sep. 12, 2023 (IN) ............................ 202311061253

(51) Int. Cl.
*F01D 25/24* (2006.01)
*F16D 1/076* (2006.01)

(52) U.S. Cl.
CPC ......... *F01D 25/246* (2013.01); *F01D 25/243* (2013.01); *F05D 2260/31* (2013.01); *F05D 2300/505* (2013.01)

(58) Field of Classification Search
CPC ...... F01D 25/24; F01D 25/243; F01D 25/246; F05D 2260/31; F05D 2300/505; F16D 1/076; F16D 1/033; Y10T 403/75; Y10T 403/645
See application file for complete search history.

(56) References Cited

U.S. PATENT DOCUMENTS 7,056,053 B2 * 6/2006 Schilling ................. F16B 43/02 411/537
7,367,776 B2 5/2008 Albers et al.
(Continued)

FOREIGN PATENT DOCUMENTS

CN 103244276 A 8/2013
KR 101399072 B1 5/2014

OTHER PUBLICATIONS

Seo, Junwon, et al., "Pilot Study for Investigating the Cyclic Behavior of Slit Damper Systems with Recentering Shape Memory Alloy (SMA) Bending Bars Used for Seismic Restrainers," Appl. Sci. 2015, 5, 187-208; doi: 10.3390/app5030187, downloaded from https://www.mdpi.com/2076-3417/5/3/187 on Aug. 9, 2023.

*Primary Examiner* — David E Sosnowski
*Assistant Examiner* — Maxime M Adjagbe
(74) *Attorney, Agent, or Firm* — Lorenz & Kopf LLP

(57) ABSTRACT

Spacers, structural support systems that includes the spacers, and method of coupling components therewith are provided. The spacers may include a body having oppositely disposed ends, cylindrical sidewalls extending therebetween, and radially outward extending flanges at the ends. Inner surfaces of the sidewalls define a longitudinal bore with openings at each of the ends. The bore is configured to receive a shank of a fastener such that the body is secured between a head of the fastener and a structure to which the fastener is secured. The spacer is formed from a super-elastic shape memory alloy that allows for recoverable deformation without failing when at or above a transformation temperature thereof. The sidewalls have an initial shape prior to undergoing deformation, undergo the recoverable deformation when a load thereon exceeds a first threshold, and recover back to the initial shape once the load drops below a second threshold.

15 Claims, 8 Drawing Sheets

(56) References Cited

U.S. PATENT DOCUMENTS

| | | | | |
|---|---|---|---|---|
| 10,196,934 | B2 | 2/2019 | Khan et al. | |
| 10,968,775 | B2 | 4/2021 | Ghosh et al. | |
| 11,021,998 | B2 | 6/2021 | Ganiger et al. | |
| 11,420,755 | B2 | 8/2022 | Sharma et al. | |
| 2014/0060062 | A1 * | 3/2014 | Subbareddyar | F01D 25/30<br>60/527 |
| 2018/0340447 | A1 * | 11/2018 | Karafillis | F01D 21/045 |

* cited by examiner

SPACERS, STRUCTURAL SUPPORT SYSTEMS, AND METHODS OF USE THEREOF

CROSS REFERENCE TO RELATED APPLICATION

This application claims priority to India Provisional Patent Application No. 202311061253, filed Sep. 12, 2023, the entire content of which is incorporated by reference herein.

TECHNICAL FIELD

The present invention generally relates to gas turbine engines, and more particularly relates to structural support systems configured to reduce vibrations in gas turbine engines that occur after a fan blade out event.

BACKGROUND

During operation of a gas turbine engine, an unlikely event, referred to as a "fan blade out" (FBO) event, could occur and refers to a highly unlikely situation where one or more fan blades break or detach from the fan rotor. Upon detection of an unlikely FBO event, the gas turbine engine is rapidly decelerated, where the rotor speed drops suddenly from the normal flight operating rotation speed down to a windmilling speed.

Should an unlikely FBO event occur, it can have serious implications for the engine's performance. The sudden loss of a fan blade disrupts the balance and aerodynamics of the rotating fan assembly, leading to an imbalance in the engine. The uneven distribution of forces can cause severe vibrations, which may lead to additional mechanical failures or damage to other engine components.

Modern gas turbine engines include robust containment structures around the fan section to prevent the broken fan blades from penetrating other engine components or escaping from the engine casing. However, due to the severity of postulated FBO events, there is an ongoing desire to further enhance the reliability and safety of gas turbine engines. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a spacer is provided that includes a body having oppositely disposed first and second ends, cylindrical sidewalls extending between the first and second ends, and radially outward extending flanges at the first and second ends. Inner surfaces of the sidewalls define a longitudinal bore with openings at each of the first and second ends. The bore is configured to receive therethrough a shank of a fastener such that the body is secured between a head of the fastener and a structure to which the fastener is secured. The body of the spacer is formed from a super-elastic shape memory alloy that allows the sidewalls to undergo recoverable deformation without failing when at or above a transformation temperature of the super-elastic shape memory alloy. The sidewalls have an initial shape prior to undergoing deformation and are configured to undergo the recoverable deformation when a load transmitted through the sidewalls exceeds a first load threshold and recover back to the initial shape once the load drops below a second load threshold that is less than the first load threshold.

In various embodiments, a structural support system for a gas turbine engine is provided that includes a first flange having a first hole, a second flange having a second hole, a fastener configured to secure the first flange and the second flange to each other by inserting a shank of the fastener through the aligned first hole and second hole and securing the shank therein, and a spacer that includes a body having oppositely disposed first and second ends, cylindrical sidewalls extending between the first and second ends, and radially outward extending flanges at the first and second ends. Inner surfaces of the sidewalls define a longitudinal bore with openings at each of the first and second ends. The bore is configured to receive therethrough the shank of the fastener such that the body is secured between the first flange and a head of the fastener while the first flange and the second flange are secured to each other with the fastener. The body of the spacer is formed from a super-elastic shape memory alloy that allows the sidewalls to undergo recoverable deformation without failing when at or above a transformation temperature of the super-elastic shape memory alloy. The sidewalls have an initial shape prior to undergoing deformation and are configured to undergo the recoverable deformation when a load transmitted through the sidewalls exceeds a first load threshold and recover back to the initial shape once the load drops below a second load threshold that is less than the first load threshold.

In various embodiments, a method is provided that includes locating a first flange having a first hole in proximity to a second flange having a second hole such that the first hole and the second hole are aligned, inserting a shank of a fastener into a longitudinal bore of a spacer, the longitudinal bore defined by inner surfaces cylindrical sidewalls of the spacer extending between oppositely disposed first and second ends of the spacer, inserting the shank of the fastener through the aligned first hole and second hole, and securing the shank therein to thereby secure the first flange and the second flange to each other, wherein the spacer is located between the first flange and a head of the fastener while the first flange and the second flange are secured to each other with the fastener. The spacer is formed from a super-elastic shape memory alloy that allows the sidewalls to undergo recoverable deformation without failing when at or above a transformation temperature of the super-elastic shape memory alloy. The sidewalls have an initial shape prior to undergoing deformation and are configured to undergo the recoverable deformation when a load transmitted through the sidewalls exceeds a first load threshold and recover back to the initial shape once the load drops below a second load threshold that is less than the first load threshold.

Furthermore, other desirable features and characteristics of the spacer, the structural support system, and the method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, embodiments of the present disclosure include structural support systems for gas turbine engines. The structural support systems are configured to maintain components in fixed relative locations during normal operation of the gas turbine engines, reduce loads applied to rotating components during high loading conditions (e.g., fan blade out (FBO) event), and reduce vibrations once the high loading conditions cease (e.g., post-FBO event windmilling).

Figure 1:
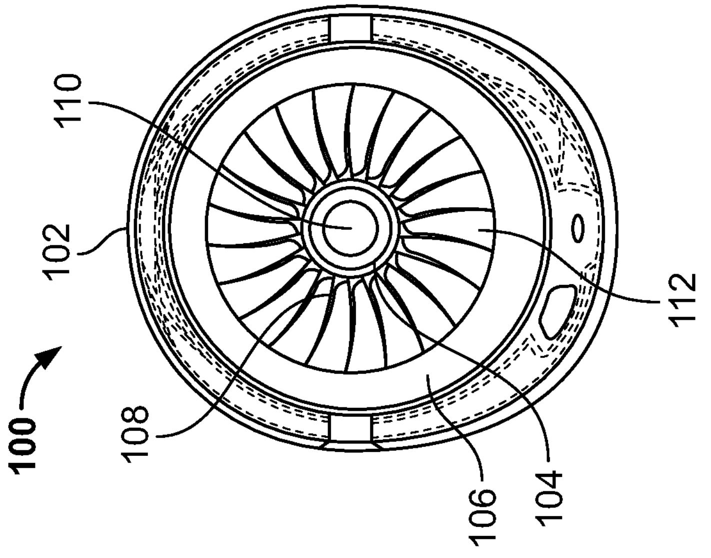

Referring to FIG. 1, a cross-sectional view of an exemplary turbofan gas turbine engine 100 is illustrated. The gas turbine engine 100 is a component of an aircraft's propulsion system. It includes an aerodynamically smooth outer covering referred to as a nacelle cowling 102 that wraps around and substantially encases internal components of the gas turbine engine 100. The nacelle cowling 102 is typically wider at the front or inlet end 200 of the gas turbine engine 100 and narrower at the back or exhaust end 202 of the gas turbine engine 100. A nacelle inlet assembly 204 circumscribes the inlet cavity 112 and is radially spaced from an engine centerline (for example engine centerline 300 of FIG. 3). A subcomponent of the nacelle inlet assembly 204 is a nacelle inlet forward compartment 106. The engine fan assembly 104 includes a plurality of fan blades 108 that are attached to, and extend radially out from, a fan rotor hub 110 centered within inlet cavity 112. In various embodiments, an engine fan housing structure 206 is attached to the nacelle cowling 102.

Figure 2:
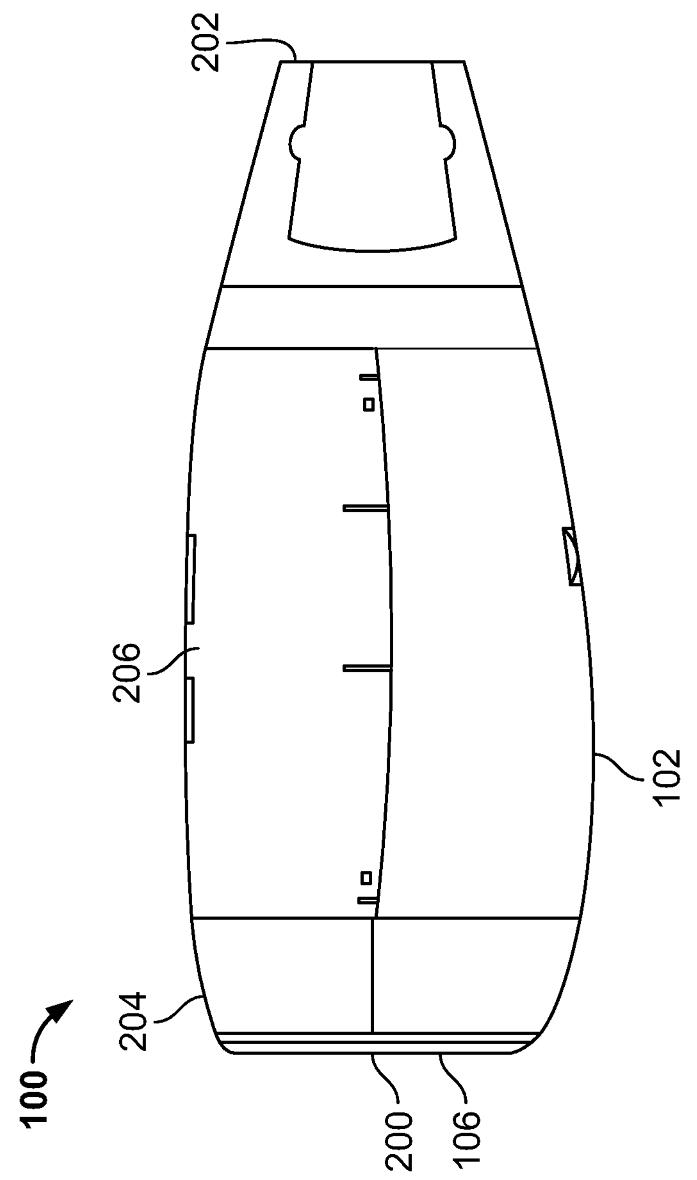
FIGS. 1 and 2 are front and side views of a turbofan gas turbine engine in accordance with an embodiment.
Figure 3:
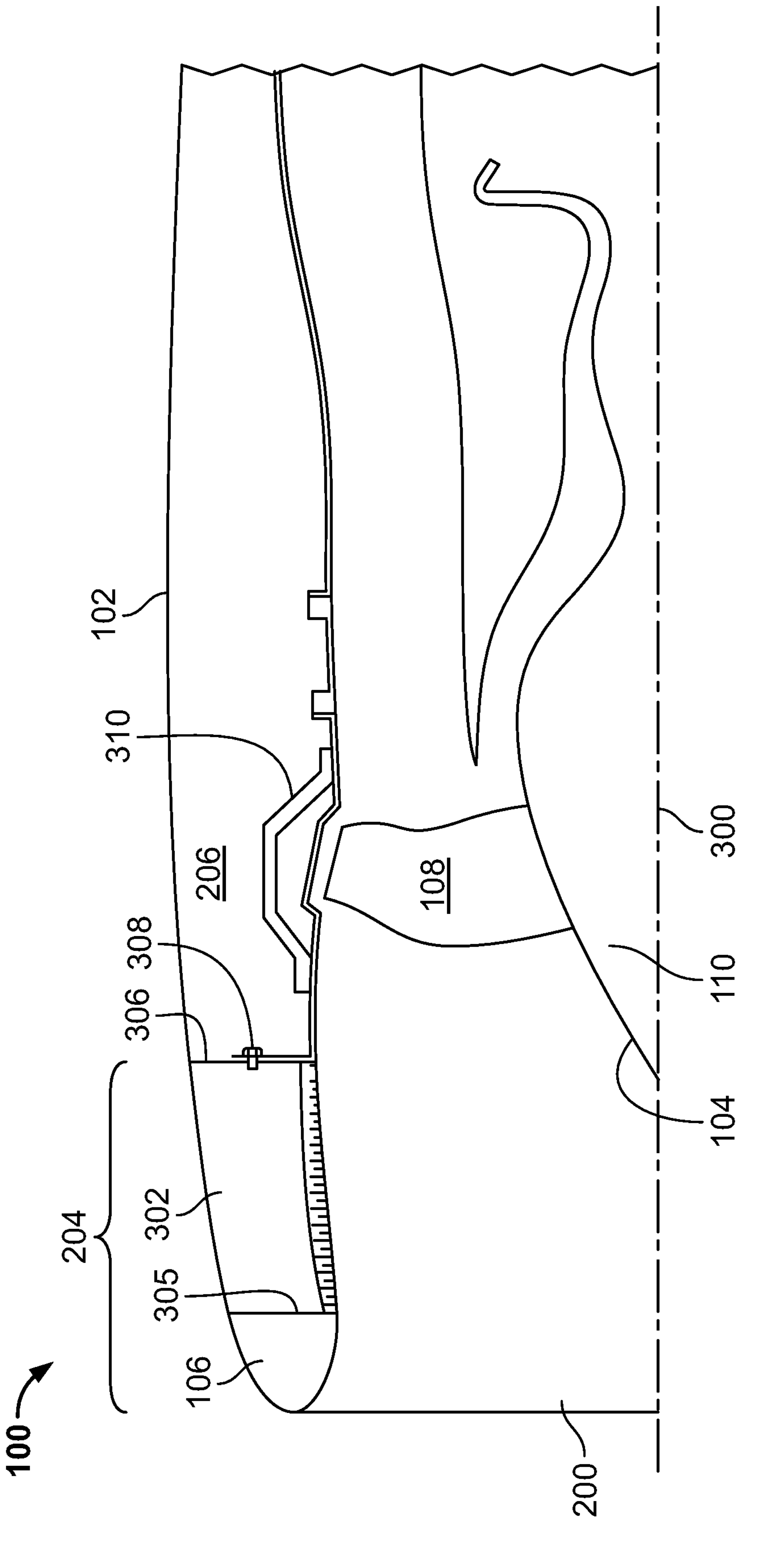
FIG. 3 is a partial cross-sectional view of the turbofan gas turbine engine of FIGS. 1 and 2 and representing certain components thereof in accordance with an embodiment.

FIG. 3 is a cross-sectional view of a front portion of the gas turbine engine 100 shown in FIGS. 1 and 2. Only the upper half of the gas turbine engine 100, delineated by centerline 300, is shown for clarity. As can be seen, the nacelle inlet assembly 204 comprises a number of separate, but detachable, parts including nacelle inlet outer skin 302 and the nacelle inlet forward compartment 106. The nacelle inlet outer skin 302, a subcomponent of nacelle cowling 102 is detachably coupled to the engine fan housing structure 206 at, for example, an aft bulkhead 306 by fasteners 308. The nacelle inlet forward compartment 106 is coupled to nacelle inlet outer skin 302 at the forward bulkhead 305. The nacelle inlet outer skin 302 is coupled to nacelle cowling 102. The engine fan assembly 104, including the fan rotor hub 110 and a plurality of the fan blades 108 (only one of which is shown in FIG. 3), is positioned for rotation such that the tips of the fan blades 108 are accommodated within a fan containment structure 310 that is positioned circumferentially around the fan rotor hub 110 to protect the aircraft from damage by the fan blades 108.

Figure 4:
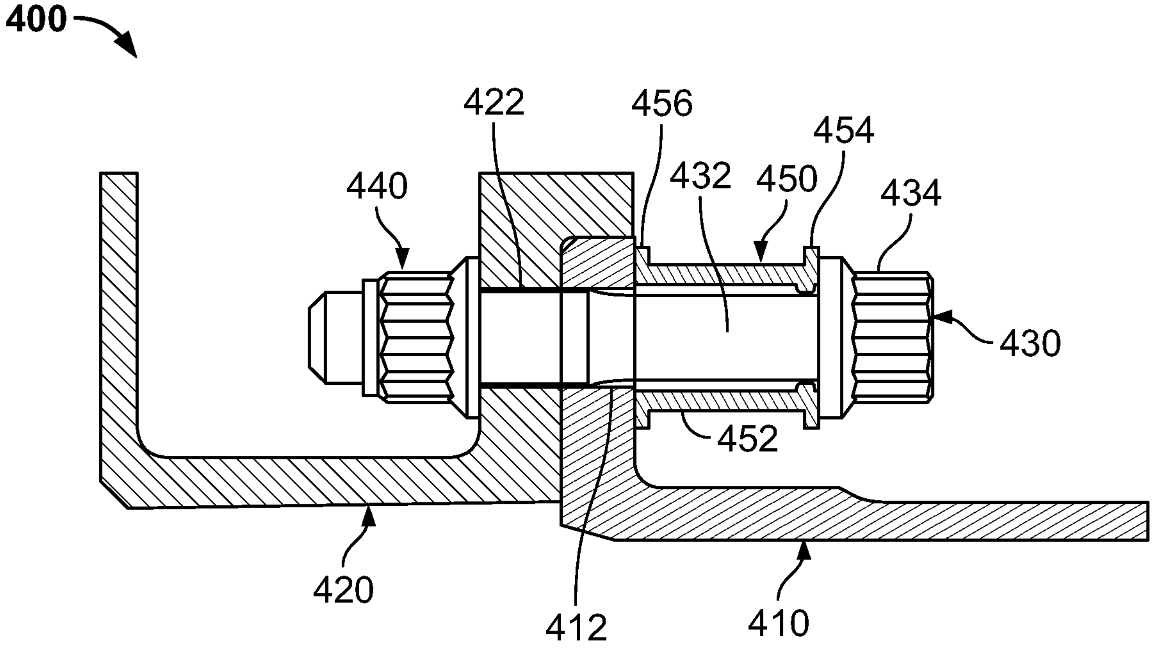
FIG. 4 is an isolated view of components of a structural support system of a gas turbine engine in accordance with an embodiment.
Figure 5:
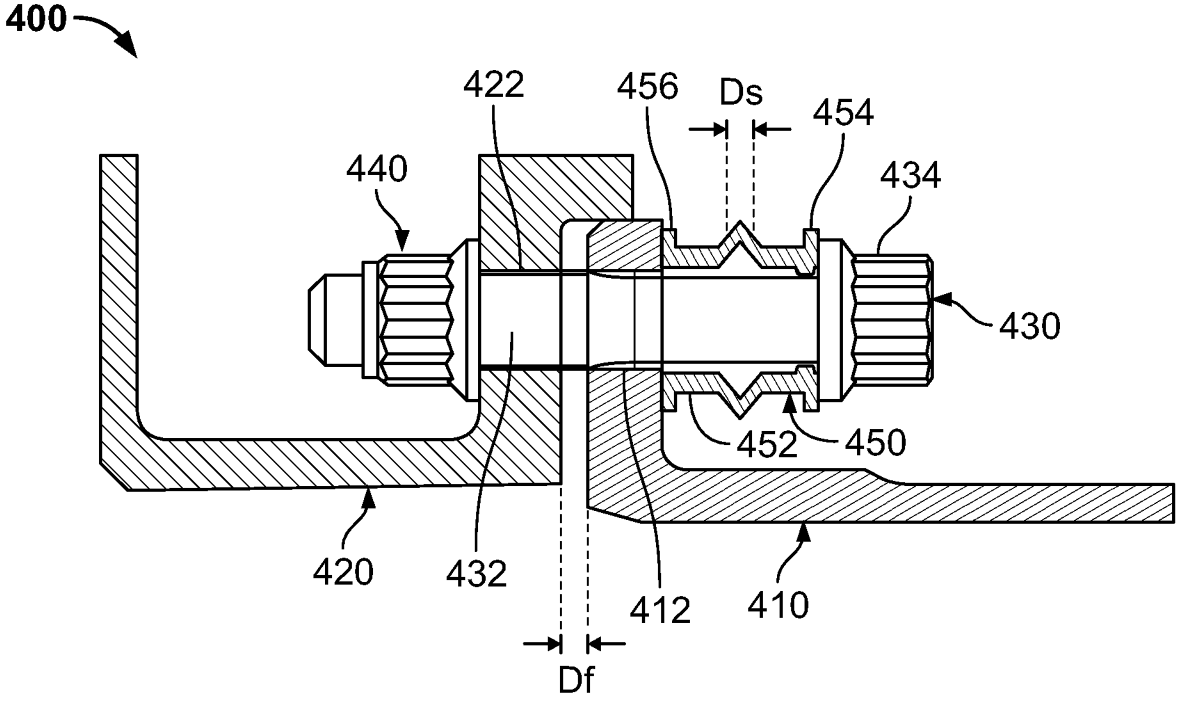
FIG. 5 is an isolated view of the components of the structural support system of FIG. 4 with a spacer thereof in a deformed state in accordance with an embodiment.

Referring now to FIGS. 4 and 5, an exemplary portion of a structural support system 400 of the gas turbine engine 100 is provided. The exemplary portion of the structural support system 400 shown in FIGS. 4 and 5 includes a first flange 410, a second flange 420, a fastener 430, a nut 440, and a spacer 450. The first flange 410 and the second flange 420 may be portions of various components within the gas turbine engine 100. In various embodiments, the first flange 410 is a forward end of a containment housing (e.g., the engine fan housing structure 206) and the second flange 420 is an aft end of a nacelle inlet assembly (e.g., the nacelle inlet assembly 204). It should be understood that the exemplary portion of the gas turbine engine 100 presented in FIGS. 4 and 5 are merely exemplary, and the teachings herein are applicable to other portions of the gas turbine engine 100, including portions wherein a fastener couples components without flanges. In addition, the teachings disclosed herein may be suitable for use in applications other than coupling components within a gas turbine engine.

Referring again to FIG. 4, the first flange 410 includes a first hole 412 and the second flange 420 includes a second hole 422. The first flange 410 and the second flange 420 are located in proximity to each other such that the first hole 412 and the second hole 422 are aligned along respective central axes thereof. The fastener 430 includes an elongated shank 432 with a head 434 on a first end thereof. The spacer 450 includes a body having oppositely disposed first and second ends, cylindrical sidewalls 452 extending between the first and second ends, and radially outward extending flanges 454 and 456 at the first and second ends, respectively. Inner surfaces of the sidewalls 452 define a longitudinal bore with openings at each of the first and second ends.

The shank 432 of the fastener 430 is located within and through the longitudinal bore of the spacer 450 and within and through the first hole 412 of the first flange 410 and the second hole 422 of the second flange 420 with a second end of the shank 432 protruding from the second hole 422 on a distal side of the second flange 420. The nut 440 is secured to the second end of the shank 432 to fix the first flange 410 and the second flange 420 in intimate contact with each other. In some embodiments, the shank 432 of the fastener 430 includes threads and the nut 440 is configured to threadedly and releasably secure to the second end of the shank 432.

In this arrangement, the fastener 430 and the nut 440 are configured to retain the first flange 410 and the second flange 420 on the shank 432 of the fastener 430 during operation of the gas turbine engine 100. However, the relative positions of the first flange 410 and the second flange 420 on the shank 432 are determined primarily by the spacer 450 and may vary based on the conditions of the gas turbine engine 100. Specifically, the spacer 450 is configured to maintain the first flange 410 and the second flange 420 in first relative fixed positions, for example, in contact with each other, during normal operation of the gas turbine engine 100. In the event of high loading conditions, such as an FBO event, the spacer 450 is configured to compress or otherwise change shape to allow the first flange 410 and the second flange 420 to be transition to second relative positions spaced apart on the shank 432 of the fastener 430. After the high loading conditions end, the spacer 450 is configured to return to its initial shape and size and thereby force the first flange 410 and the second flange 420 toward each other on the shank 432 of the fastener 430. In various embodiments, upon returning to the initial shape, the spacer 450 may force the first flange 410 and the second flange 420 to return to their first relative fixed positions, for example, contacting each other. For example, FIG. 4 presents the spacer 450 in an initial shape and FIG. 5 presents the spacer 450 in a deformed shape. While in the deformed shape (FIG. 5), a longitudinal dimension of the spacer 450 is reduced by a first dimension $D_s$ relative to the initial shape, and therefore the first flange 410 and the second flange 420 are able to separate along the shank 432 by up to a second dimension $D_f$. In some embodiments, $D_s$ may be substantially equal to $D_f$. Upon a reduction of the load, the spacer 450 may return to its initial shape as presented in FIG. 4.

In various embodiments, to achieve such functionality the body of the spacer 450 is formed from or includes a super-elastic shape memory alloy (SMA) that allows the sidewalls 452 to undergo recoverable deformation at high loads without failing. SMAs have the capability to be deformed and then subsequently return to a pre-deformed shape. This capability relates to the SMAs transitioning between two different phases (and three different crystal structures) in response to temperature and loading conditions. In some embodiments, the spacer 450 is entirely formed of an SMA. In some embodiments, the spacer 450 includes a combination of an SMA and a non-SMA material (e.g., an aluminum alloy). In some embodiments, the sidewalls 452 are formed of an SMA and the flanges 454 and 456 are formed of a non-SMA material.

The phase transformation of SMAs is temperature and stress dependent. Below a transformation temperature of the SMA, the material is in the martensite phase. Application of a mechanical load in this state may cause deformation which is maintained after release of the mechanical load. Upon sufficient heating of the SMA, the material transitions to the austenite phase and the deformation is recovered. This characteristic of SMAs is referred to herein as a shape memory effect. Above the transformation temperature, the SMA is in the austenite phase. When a load above a certain value is applied in this state, the deformation causes a stress-induced phase transformation from the austenite phase to a deformed martensite phase. When the applied stress is removed, the SMA transitions to the austenite phase and reverts its initial shape. This characteristic of SMAs is referred to herein as a pseudoelastic effect (or super-elastic effect). The transformation temperature ($A_f$) may be a temperature at which the SMA completes a transition from martensite to austenite with no load applied thereto. The spacer 450 takes advantage of the pseudoelastic effect of SMAs and is configured to undergo recoverable deformation while above the transformation temperature.

Figure 12:
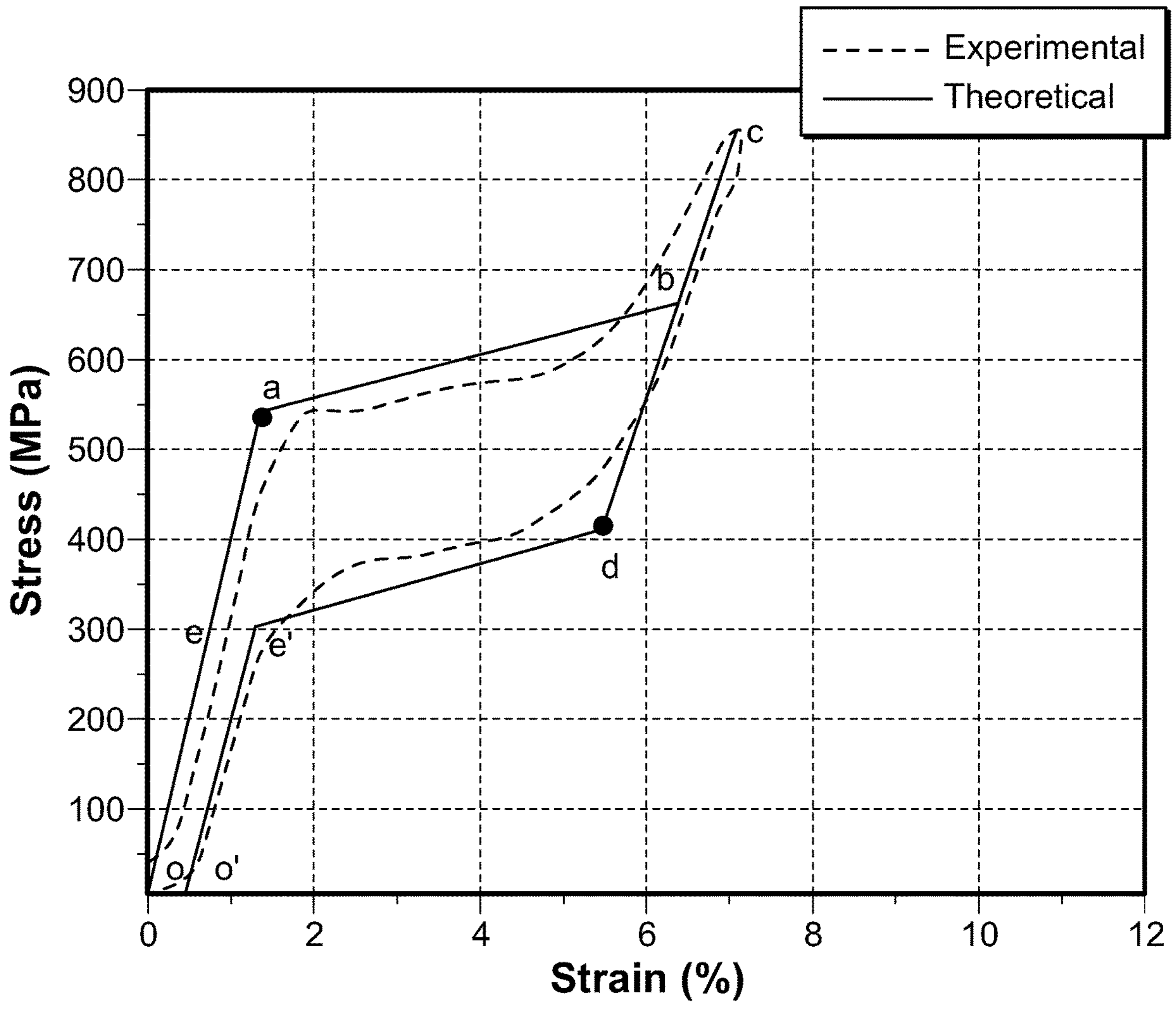
FIG. 12 is a plot representing a relationship between stress and strain of a shape memory alloy during loading and unloading above a transition temperature thereof in accordance with an embodiment.

FIG. 12 provides an example stress-strain curve illustrating the material properties of a suitable super-elastic shape memory alloy above its transformation temperature. As shown, upon application of a load at or in excess of a first load threshold (defined by points a and b in FIG. 12), the SMA may undergo a large strain, thereby allowing the SMA to deform and provide reduced stiffness. In this regard, point a in FIG. 12 represents the start of the solid-solid phase transformation from austenite to martensite, and point b in FIG. 12 represents the end of this solid-solid phase transformation. Additionally, the SMA may recover all the strain once the load drops below a second load threshold (defined by points d and e' in FIG. 12), thereby allowing the SMA to return back to its initial shape and provide increased stiffness. In this regard, point d in FIG. 12 represents the start of the reverse phase transformation from martensite to austenite, and point e' represents the end of this reverse phase transformation. It should be appreciated that the material properties of the SMA used herein for the spacer 450 may be selected such that the first load threshold (defined by points a and b in FIG. 12) is less than a predetermined load threshold at which the first flange 410, the second flange 420, and/or the fastener 430 are configured to fail.

By forming the spacer 450 from a SMA, the sidewalls 452 of the spacer 450 can be configured to have an initial shape prior to undergoing deformation, configured to undergo the recoverable deformation when a load transmitted through the sidewalls 452 exceeds the first load threshold, and configured to recover back to the initial shape once the load drops below the second load threshold. Notably, the first load threshold may be higher than the second load threshold.

The spacer 450 may be formed of various SMAs including, but not limited to, a nickel-titanium (NiTi) alloy, a nickel-titanium-hafnium (NiTiHf) alloy, a nickel-titanium-vanadium (NiTiVd) alloy, a nickeltitanium-palladium (NiTiPd) alloy, a nickel-titanium-copper (NiTiCu), a nickel-titanium-niobium (NiTiNb) alloy, a nickel-aluminum-copper (Ni—Al—Cu) alloy, a titanium-niobium (Ti—Nb) alloy, a copper-zinc-aluminum (CuZnAl) alloy, and a copper-aluminum-beryllium (CuAlBe) alloy. In various embodiments, the spacer 450 may be formed of a nickel-titanium (NiTi) alloy having a transformation temperature of about −20° C. to 110° C., a first threshold of about 500 to 700 megapascals (MPa), and a second threshold of about 250 to 450 MPa.

The sidewalls 452 of the spacer 450 may be solid or may include one or more radial openings. As examples, FIGS. 6, 7, 8, and 9 present spacers 600, 700, 800, and 1100 in accordance with various aspects described herein. The spacers 600, 700, 800, and 1100 are formed of SMAs and configured to function as previously described in reference to the spacer 450 of FIGS. 4 and 5. The spacers 600, 700, 800, and 1100 are merely exemplary and the spacers, systems, and methods disclosed herein are not limited to the examples of FIGS. 6, 7, 8, and 9.

Figure 6:
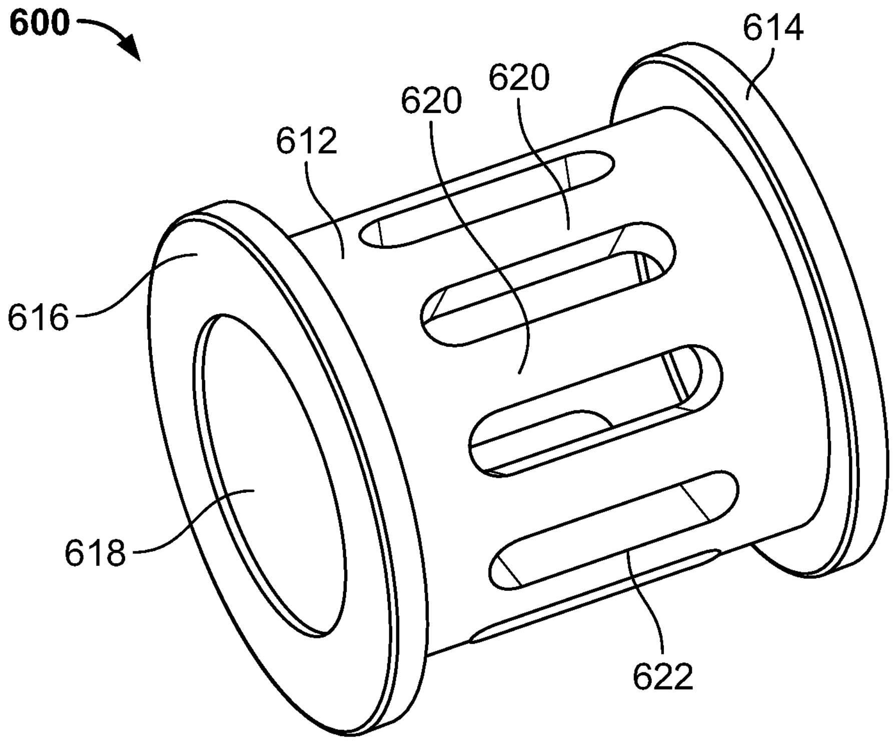
FIGS. 6, 7, 8, 9 are perspective views of spacers in accordance with embodiments.

Referring now to FIG. 6, the spacer 600 includes a body having a cylindrical sidewall 612 extending between first and second ends. A first radially outward extending flange 614 is located at the first end and a second radially outward extending flange 616 is located at the second end. Inner surfaces 618 define a longitudinal bore that extends between openings at the first end and the second end. A pattern of adjacent elongated slots 622 are formed in and spaced apart about the cylindrical sidewalls 612. Each of the slots 622 extend at least partly between the first end and the second end. The slots 622 define therebetween sidewall members 620. Upon high loading conditions, the sidewall members 620 may preferentially deform to reduce the longitudinal dimension of the spacer 600. For example, the sidewall members 620 may bend radially outward during high loading conditions and then return to their initial straight shapes once the loading sufficiently decreases. The longitudinal length, transverse widths, and radial thicknesses of the sidewall members 620 may be configured to provide specific, predetermined values or ranges for the first threshold and the second threshold.

Figure 7:
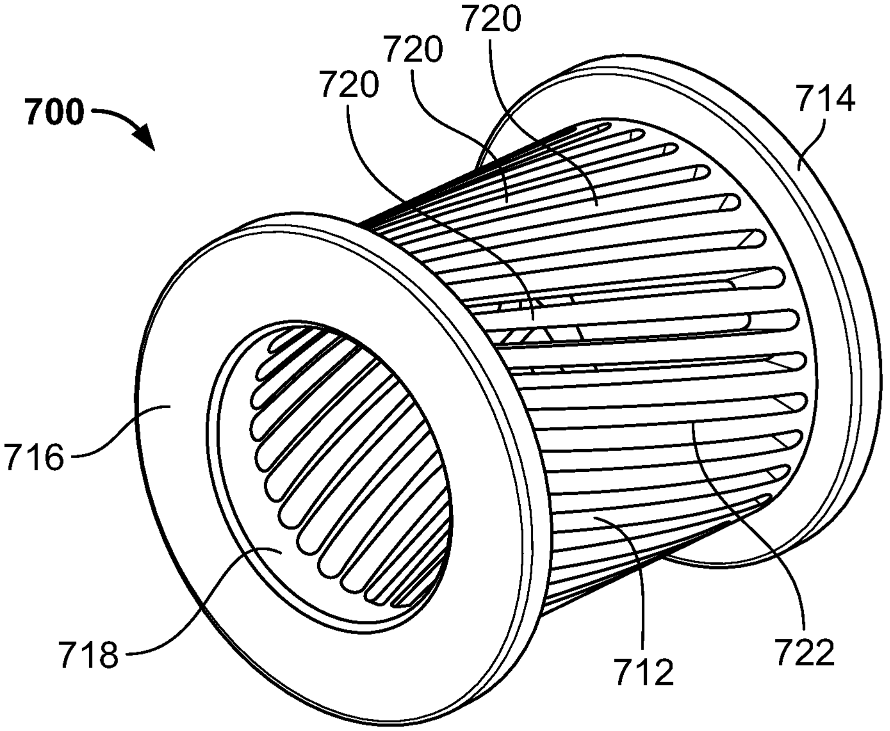

Referring now to FIG. 7, the spacer 700 includes a body having a cylindrical sidewall 712 extending between first and second ends. A first radially outward extending flange 714 is located at the first end and a second radially outward extending flange 716 is located at the second end. Inner surfaces 718 define a longitudinal bore that extends between openings at the first end and the second end. A pattern of adjacent elongated slots 722 are formed in and spaced apart about the cylindrical sidewalls 712. Each of the slots 722 extend at least partly between the first end and the second end. Each of the slots 722 have a first end and a second end that are longitudinally offset from each other such that central axes of each of the slots 722 are not parallel to a central longitudinal axis of the longitudinal bore. The slots 722 define therebetween sidewall members 720. Upon high loading conditions, the sidewall members 720 may preferentially deform to reduce the longitudinal dimension of the spacer 700. For example, the sidewall members 720 may bend radially outward during high loading conditions and then return to their initial straight shapes once the loading sufficiently decreases. In addition, due to the arrangement of the sidewall members 720, the sidewalls 712 may twist in response to the sidewall members 720 bending radially outward. The longitudinal length, transverse widths, radial thicknesses, and the offset of the first and second ends of the sidewall members 720 may be adjusted to provide specific, predetermined values or ranges for the first threshold and the second threshold.

Figure 8:
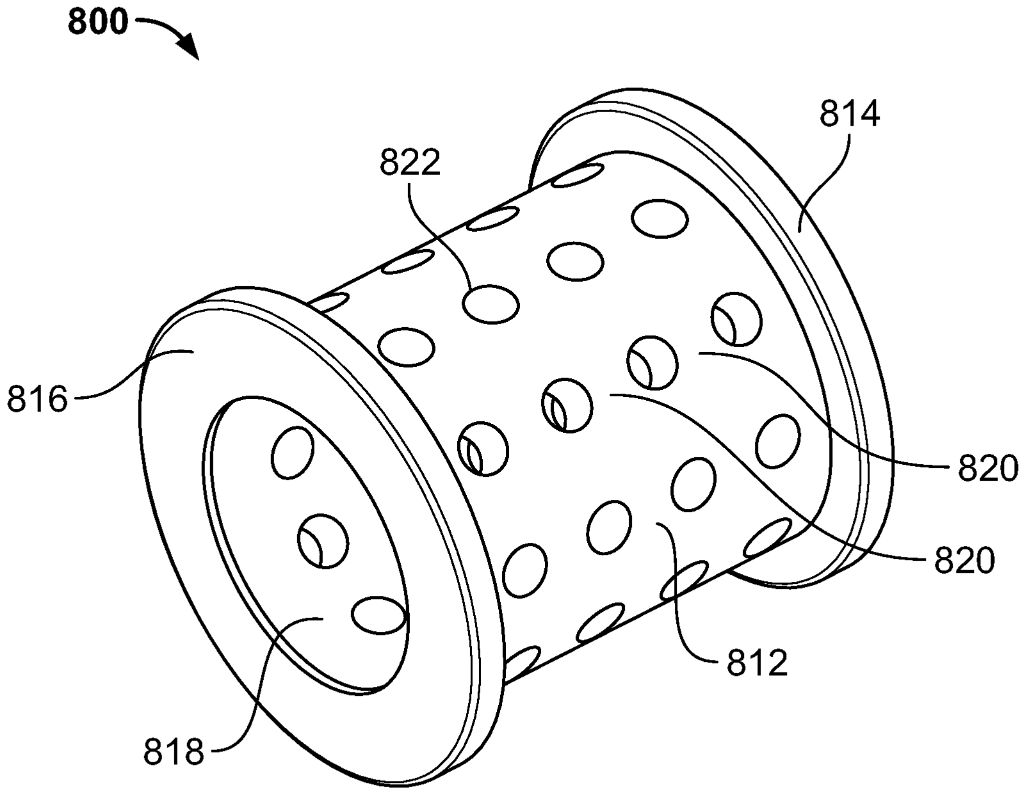

Referring now to FIG. 8, the spacer 800 includes a body having a cylindrical sidewall 812 extending between first and second ends. A first radially outward extending flange 814 is located at the first end and a second radially outward extending flange 816 is located at the second end. Inner surfaces 818 define a longitudinal bore that extends between openings at the first end and the second end. A pattern or an array of holes 822 is formed in the cylindrical sidewalls 812. The holes 822 may optionally be equidistantly spaced apart. The holes 822 define therebetween sidewall members 820. Upon high loading conditions, the sidewall members 820 may preferentially deform to reduce the longitudinal dimension of the spacer 800. For example, the sidewall members 820 may bend radially outward during high loading conditions and then return to their initial shapes once the loading sufficiently decreases. The diameters, quantity, and spacing of the holes 822 as well as the radial thicknesses of the sidewall members 820 may be adjusted to provide specific, predetermined values or ranges for the first threshold and the second threshold.

Figure 9:
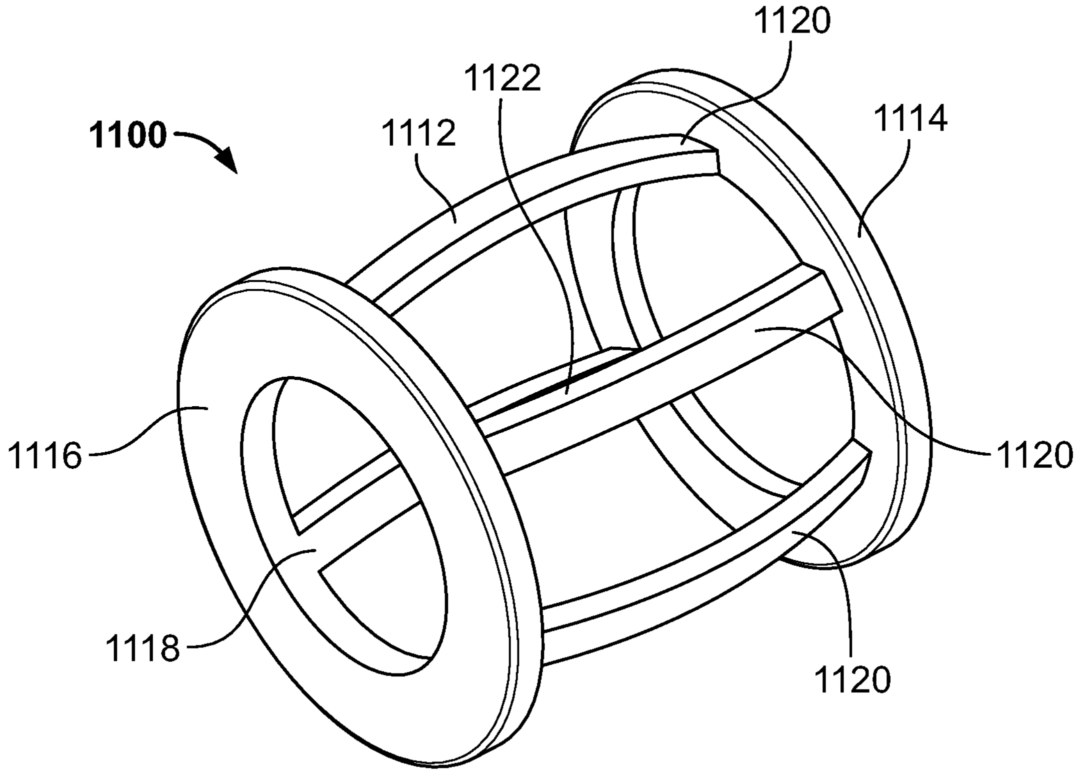

Referring now to FIG. 9, the spacer 1100 includes a body having a curved or bowed (convex or radially outwardly protruding) cylindrical sidewall 1112 extending between first and second ends. A first radially outward extending flange 1114 is located at the first end and a second radially outward extending flange 1116 is located at the second end. Inner surfaces 1118 define a longitudinal bore that extends between openings at the first end and the second end. A pattern of adjacent elongated slots 1122 are formed in and spaced apart about the cylindrical sidewalls 1112. Each of the slots 1122 extend at least partly between the first end and the second end. The slots 1122 define therebetween sidewall members 1120. Upon high loading conditions, the sidewall members 1120 may preferentially deform to reduce the longitudinal dimension of the spacer 1100. For example, the sidewall members 1120 may bend radially outward during high loading conditions and then return to their curved or bowed shapes once the loading sufficiently decreases. The longitudinal length, transverse widths, angle of curvature, and radial thicknesses of the sidewall members 1120 may be configured to provide specific, predetermined values or ranges for the first threshold and the second threshold.

Figure 10:
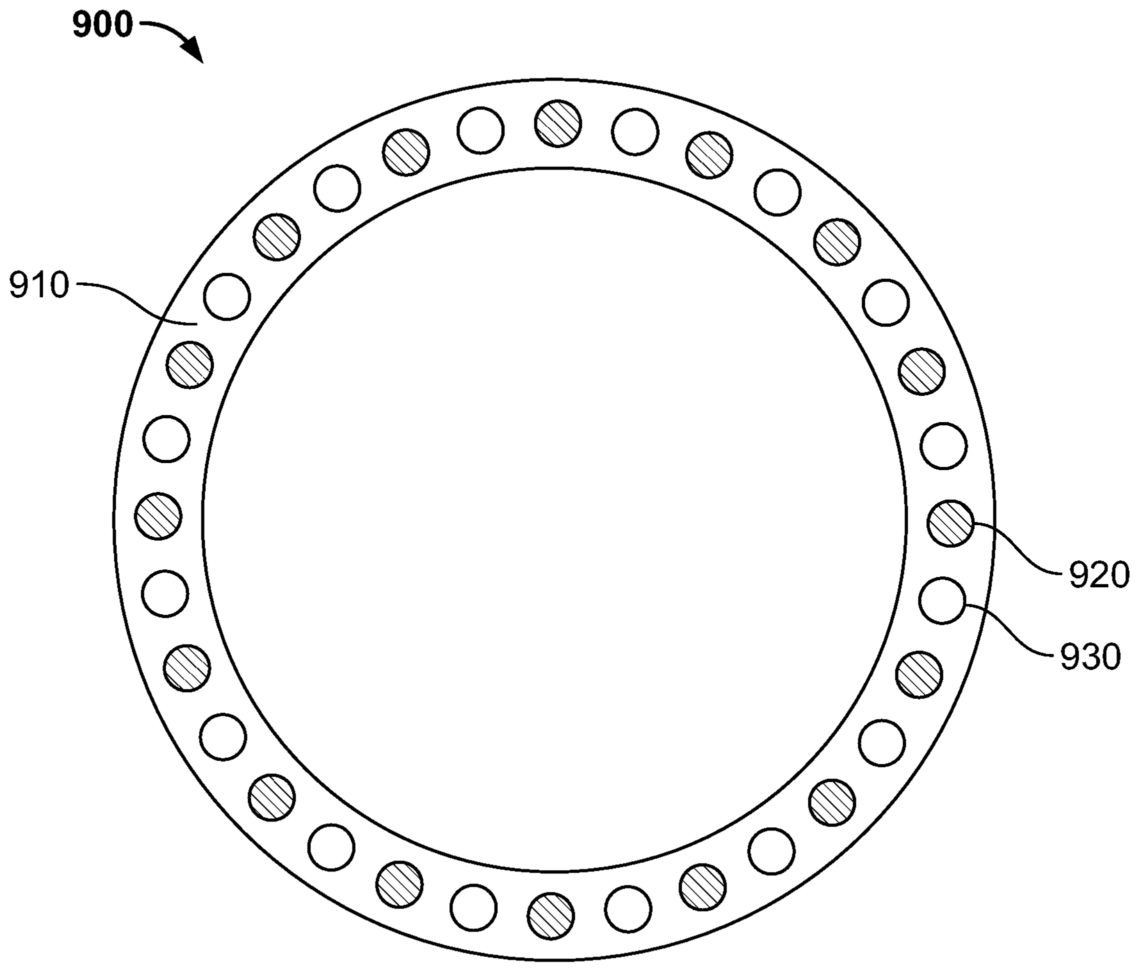
FIG. 10 is an end view of a component interface that includes a plurality of spacers about a circumference thereof in accordance with an embodiment.

Referring now to FIG. 10, a component interface 900 is presented that includes a pair of cylindrical flanges (only a first flange 910 shown) that are coupled via a plurality of fasteners (not shown for clarity) secured within a plurality of holes on each of the pair of flanges. In various embodiments, the pair of cylindrical flanges may be components within the gas turbine engine 100. Each of the fasteners include a first spacer 920 or a second spacer 930 secured thereon as described in reference to the spacer 450 of FIGS. 4 and 5. The first spacers 920 are formed of an SMA as previously described and the second spacers 930 are formed of a material that is not an SMA (e.g., an aluminum alloy such as Al 6061-T6). Upon high loading conditions, the first spacers 920 and the second spacers 930 may deform to reduce load transfer through the component interface 900. Once the loading conditions sufficiently reduce, the first spacers 920 may return to their initial shape and thereby apply compressive forces on the pair of flanges. In contrast, the second spacers 930 plastically deformed and remain in the deformed state upon reduction of the loading conditions.

In this example, an equal number of the first spacers 920 and the second spacers 930 are arranged in an alternating pattern about the component interface 900. However, component interfaces may include any number of the first spacers 920 and any number of the second spacers 930, the first spacers 920 and the second spacers 930 may be arranged in any pattern, and additional spacers formed of other materials or having other structural configurations may be incorporated. In this manner, the compressive forces applied to the pair of flanges prior to and subsequent to high loading conditions may be selectively tailored.

Combinations of spacers formed of SMAs (e.g., the spacers 920) and spacers formed of non-SMA materials (e.g., the spacers 930) may provide various benefits in certain applications. For example, the spacers formed of non-SMA materials may resist deformation at higher loads, may resist deformation more predictably, or may provide another beneficial property. In such instances, the spacers formed of non-SMA materials may be used to control the deformation load of the flange interface structure. The spacers formed of SMAs may then be used to apply the post-high loading condition compressive forces to, for example, reduce vibrations in the gas turbine engine 100.

As a specific but nonlimiting example, the component interface 900 may correspond to a nacelle inlet an interface between a fan inlet and a fan containment housing of a gas turbine engine. In an FBO event, high load conditions may cause the first spacers 920 and the second spacers 930 to be crushed. This may desirable, for example, to prevent damage to other component of the gas turbine engine. After the engine fan assembly rotation has been reduced to a windmilling speed, the first spacers 920 return to their initial shape whereas the second spacers 930 remain crushed. If the gas turbine engine only included the second spacers 930 and did not have at least some of the first spacers 920, then the remaining axial play of the components on the fasteners (that is, the space available on the shank for the components to move) may have the potential to cause significant vibration and/or dangling during the remainder of flight which in turn may cause failure of the component interface 900. In contrast, the presence of the first spacers 920 provides for at least some compressive forces to be reapplied to the component interface 900 thereby reducing the likelihood of the significant vibration and/or dangling caused by the axial play which would otherwise be present.

Figure 11:
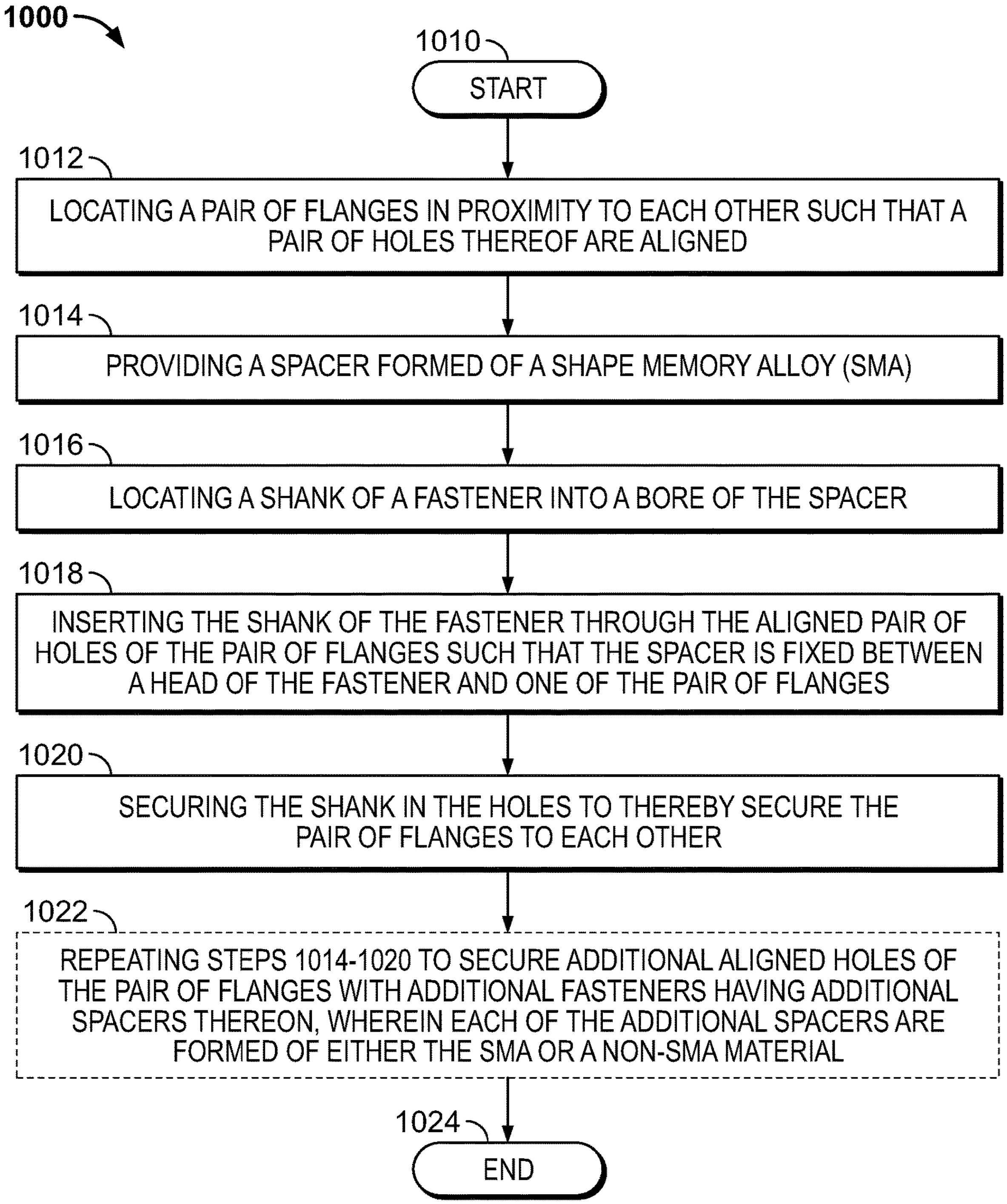
FIG. 11 is a flowchart illustrating an exemplary method for coupling components of a gas turbine engine in accordance with an embodiment.

The systems disclosed herein, including the structural support system 400, provide for methods of coupling components. For example, FIG. 11 is a flowchart illustrating an exemplary method 1000. The method 1000 may start at 1010. At 1012, the method 1000 may include locating a first flange having a first hole in proximity to a second flange having a second hole such that the first hole and the second hole are aligned.

At 1014, the method 1000 may include providing a spacer formed of an SMA. Providing the spacer may include manufacturing the spacer by one or more of various processes (e.g., casting, machining, finishing, etc.). Such processes are generally known in the art and will not be discussed in detail herein. The spacer may be formed of one or more of various SMAs including those described herein.

At 1016, the method 1000 may include inserting a shank of a fastener, such as a bolt, into a longitudinal bore of the spacer. At 1018, the method 1000 may include inserting the shank of the fastener through the aligned first hole and second hole of the first flange and the second flange, respectively. In this arrangement, the spacer is located between a face or surface of the first flange and a head of the fastener while the first flange and the second flange are secured to each other with the fastener. At 1020, the method 1000 may include securing the shank in the aligned first hole and the second hole to thereby secure the first flange and the second flange to each other. The fastener may be secured by various means such as, but not limited to, a threadedly coupled nut.

At 1022, the method 1000 may optionally include repeating steps 1014-1020 with additional fasteners and spacers to secure additional aligned holes of the first flange and the second flange with the additional fasteners having the additional spacers thereon. In such embodiments, each of the additional spacers are formed of either SMA or a non-SMA material. In some embodiments, all of the additional spacers are formed of an SMA. In some embodiments, at least one of the additional spacers is formed of a material that is not and does not include an SMA.

In a specific embodiment, the method 1000 may include inserting a shank of a second fastener into a longitudinal bore of a second spacer, the longitudinal bore defined by inner surfaces cylindrical sidewalls of the second spacer extending between oppositely disposed first and second ends of the second spacer, inserting the shank of the second fastener through a third hole of the first flange and a fourth hole of the second flange that is aligned with the third hole of the first flange, and securing the shank of the second fastener in the third hole and the fourth hole to secure the third flange and the fourth flange to each other. The second spacer may be located between the third flange and a head of the fastener, and may be formed of a material that is not an SMA.

The method 1000 may end at 1024.

In various embodiments, the first flange and the second flange are parts of a gas turbine engine. In such embodiments, the method 1000 may include operating the gas turbine engine in a first manner that imparts a first load on the spacer that exceeds the first load threshold causing the spacer to undergo recoverable deformation and allowing the first and second flanges to partially separate along the shank of the fastener. The method 1000 may further include operating the gas turbine engine in a second manner that imparts a second load on the spacer that is less than the second threshold causing the spacer to recover back to the initial shape and thereby causing the first and second flanges to contact and be fixed relative to each other along the shank of the fastener.

The systems and methods disclosed herein provide various benefits over certain existing systems and methods. For example, the spacers of the structural systems provide for applying subsequent to high loading conditions which may limit or reduce the likelihood of vibrations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A spacer comprising a body having oppositely disposed first and second ends, cylindrical sidewalls extending between the first and second ends, and radially outward extending flanges at the first and second ends, wherein inner surfaces of the sidewalls define a longitudinal bore with openings at each of the first and second ends, wherein the longitudinal bore is configured to receive therethrough a shank of a fastener such that the body is secured between the a head of the fastener and a structure to which the fastener is secured, wherein the body of the spacer includes a super-elastic shape memory alloy that allows the sidewalls to undergo recoverable deformation without failing when at or above a transformation temperature of the super-elastic shape memory alloy, wherein the sidewalls have an initial shape prior to undergoing deformation and are configured to undergo the recoverable deformation when a load transmitted through the sidewalls exceeds a first load threshold and recover back to the initial shape once the load drops below a second load threshold that is less than the first load threshold, wherein the cylindrical sidewalls are formed of the super-elastic shape memory alloy and the radially outward extending flanges are formed of a material that is not a super-elastic shape memory alloy.

2. The spacer of claim 1, wherein the first load threshold is between 500 and 700 MPA and the second load threshold is between 250 and 450 MPa.

3. The spacer of claim 1, further comprising one or more radial openings in the cylindrical sidewalls, wherein the one or more radial openings include an array of holes equidistantly spaced apart about the cylindrical sidewalls, wherein the array includes at least two holes longitudinally along the cylindrical sidewalls.

4. The spacer of claim 1, further comprising one or more radial openings in the cylindrical sidewalls, wherein the one or more radial openings include adjacent slots spaced apart about the cylindrical sidewalls and each extending between the first and second ends, wherein each of the slots have a first end and a second end that are longitudinally offset from each other such that central axes of each of the slots are not parallel to a central longitudinal axis of the longitudinal bore, wherein the first end and the second end of each of the slots are longitudinally offset in the same direction, wherein the cylindrical sidewalls are configured to bend radially outward and twist while the sidewalls undergoing recoverable deformation.

5. The method of claim 1, further comprising one or more radial openings in the cylindrical sidewalls, wherein the one or more radial openings include adjacent slots spaced apart about the cylindrical sidewalls and each extending between the first and second ends, wherein the cylindrical sidewalls are bowed to protrude radially outward between the first and second ends while in the initial shape.

6. A structural support system for a gas turbine engine, comprising:

a first flange having a first hole;

a second flange having a second hole;

a fastener configured to secure the first flange and the second flange to each other by inserting a shank of the fastener through the first hole and the second hole while the first hole and the second hole are aligned and securing the shank therein; and a spacer that includes a body having oppositely disposed first and second ends, cylindrical sidewalls extending between the first and second ends, and radially outward extending flanges at the first and second ends, wherein inner surfaces of the sidewalls define a longitudinal bore with openings at each of the first and second ends, wherein the longitudinal bore is configured to receive therethrough the shank of the fastener such that the body is secured between the first flange and a head of the fastener while the first flange and the second flange are secured to each other with the fastener, wherein the body of the spacer includes a super-elastic shape memory alloy that allows the sidewalls to undergo recoverable deformation without failing when at or above a transformation temperature of the super-elastic shape memory alloy, wherein the sidewalls have an initial shape prior to undergoing deformation and are configured to undergo the recoverable deformation when a load transmitted through the sidewalls exceeds a first load threshold and recover back to the initial shape once the load drops below a second load threshold that is less than the first load threshold, wherein the cylindrical sidewalls include one or more radial openings, wherein the one or more radial openings include adjacent slots spaced apart about the cylindrical sidewalls and each extending between the first and second ends, wherein each of the slots have a first end and a second end that are longitudinally offset from each other such that central axes of each of the slots are not parallel to a central longitudinal axis of the longitudinal bore, wherein the first end and the second end of each of the slots are longitudinally offset in the same direction, wherein the cylindrical sidewalls are configured to bend radially outward and twist while the sidewalls undergoing recoverable deformation.

7. The structural support system of claim 6, wherein the first hole is a first of a plurality of holes in the first flange, the second hole is a first of a plurality of holes in the second flange, the fastener is a first of a plurality of fasteners configured to be received in a respective one of the plurality of holes to secure the first flange to the second flange, and the spacer is a first of a plurality of spacers configured to be located on the shank of a respective one of the plurality of fasteners while the first flange and the second flange are secured therewith, wherein at least some of the plurality of spacers are formed of a material that is not a super-elastic shape memory alloy, wherein the plurality of spacers include a first quantity of spacers that include the super-elastic shape memory alloy and a second quantity of spacers that are formed of the material that is not a super-elastic shape memory alloy, wherein the relative amounts of the first quantity of spacers and the second quantity of spacers are selectively tailored to provide predetermined compressive forces prior to the load exceeding the first load threshold and subsequent to the load dropping below the second load threshold.

8. The structural support system of claim 6, wherein the first load threshold is less than a third load threshold corresponding to a load capable of damaging the first flange or the second flange.

9. The structural support system of claim 6, wherein the first load threshold is between 500 and 700 MPA and the second load threshold is between 250 and 450 MPa.

10. The method of claim 6, wherein the cylindrical sidewalls are formed of the super-elastic shape memory alloy and the radially outward extending flanges are formed of a material that is not a super-elastic shape memory alloy.

11. A method, comprising:

locating a first flange having a first hole in proximity to a second flange having a second hole such that the first hole and the second hole are aligned;

inserting a shank of a fastener into a longitudinal bore of a spacer, the longitudinal bore defined by inner surfaces cylindrical sidewalls of the spacer extending between oppositely disposed first and second ends of the spacer;

inserting the shank of the fastener through the first hole and the second hole while the first hole and the second hole are aligned; and securing the shank therein to thereby secure the first flange and the second flange to each other, wherein the spacer is located between the first flange and a head of the fastener while the first flange and the second flange are secured to each other with the fastener, wherein the spacer includes a super-elastic shape memory alloy that allows the sidewalls to undergo recoverable deformation without failing when at or above a transformation temperature of the super-elastic shape memory alloy, wherein the sidewalls have an initial shape prior to undergoing deformation and are configured to undergo the recoverable deformation when a load transmitted through the sidewalls exceeds a first load threshold and recover back to the initial shape once the load drops below a second load threshold that is less than the first load threshold, wherein the first hole is a first of a plurality of holes in the first flange, the second hole is a first of a plurality of holes in the second flange, the fastener is a first of a plurality of fasteners, and the spacer is a first of a plurality of spacers, wherein the plurality of spacers include a first quantity of spacers that include the super-elastic shape memory alloy and a second quantity of spacers that are formed of the material that is not a super-elastic shape memory alloy, the method including:

securing the first flange and the second flange by inserting each of the plurality of fasteners into a respective one of the plurality of holes and securing the fasteners therein, wherein each of the plurality of spacers are located on the shank of a respective one of the plurality of fasteners while the first flange and the second flange are secured therewith; and selectively tailoring relative amounts of the first quantity of spacers and the second quantity of spacers to provide predetermined compressive forces on the first flange and the second flange prior to the load exceeding the first load threshold and subsequent to the load dropping below the second load threshold.

12. The method of claim 11, wherein the first and second flanges are parts of a gas turbine engine, the method comprising:

operating the gas turbine engine in a first manner that imparts a first load on the spacer that exceeds the first load threshold causing the spacer to undergo the recoverable deformation and allowing the first and second flanges to partially separate along the shank of the fastener; and operating the gas turbine engine in a second manner that imparts a second load on the spacer that is less than the second load threshold causing the spacer to recover back to the initial shape and thereby causing the first and second flanges to contact and be fixed relative to each other along the shank of the fastener.

13. The method of claim 12, wherein the first load threshold is less than a third load threshold corresponding to a load capable of damaging the first flange or the second flange.

14. The method of claim 12, wherein the first load threshold is between 500 and 700 MPA and the second load threshold is between 250 and 450 MPa.

15. The method of claim 11, further comprising:

inserting a shank of a second fastener into a longitudinal bore of a second spacer, the longitudinal bore defined by inner surfaces of the cylindrical sidewalls of the second spacer extending between oppositely disposed first and second ends of the second spacer;

inserting the shank of the second fastener through a third hole of the first flange and a fourth hole of the second flange that is aligned with the third hole of the first flange; and securing the shank of the second fastener in the third hole and the fourth hole to secure the first flange and the second flange to each other, wherein the second spacer is located between the first flange and a head of the second fastener, wherein the second spacer is formed of a material that is not a super-elastic shape memory alloy.

* * * * *